(12) United States Patent
Adkins et al.

(10) Patent No.: US 11,648,927 B2
(45) Date of Patent: May 16, 2023

(54) DISC BRAKE ASSEMBLY HAVING A SENSOR ASSEMBLY

(71) Applicant: ArvinMeritor Technology, LLC, Troy, MI (US)

(72) Inventors: Alex Adkins, Troy, MI (US); Daniel Philpott, Troy, MI (US); Sukrut S. Sakhare, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 85 days.

(21) Appl. No.: 17/345,202

(22) Filed: Jun. 11, 2021

(65) Prior Publication Data

US 2022/0396256 A1  Dec. 15, 2022

(51) Int. Cl.
*B60T 17/22* (2006.01)
*B60T 1/06* (2006.01)
*F16D 55/225* (2006.01)
*F16D 65/00* (2006.01)
*F16D 65/097* (2006.01)
*F16D 55/00* (2006.01)
(Continued)

(52) U.S. Cl.
CPC ............ *B60T 17/221* (2013.01); *B60T 1/065* (2013.01); *F16D 55/225* (2013.01); *F16D 65/0068* (2013.01); *F16D 65/0978* (2013.01); *F16D 2055/0016* (2013.01); *F16D 2055/0041* (2013.01); *G01D 5/16* (2013.01); *G01D 5/165* (2013.01)

(58) Field of Classification Search
CPC .......... B60T 17/221; B60T 1/065; B60T 1/06; F16D 65/0068; F16D 55/225; F16D 65/0978; F16D 66/02; F16D 66/021; F16D 66/025; F16D 66/026; F16D 66/027; F16D 66/028; F16D 65/0081; F16D 55/22; F16D 55/00; F16D 2055/0037; F16D 2250/00; F16D 2250/0084; F16D 2055/0033; F16D 2055/0016; F16D 2055/0041; G01D 5/16; G01D 5/165
See application file for complete search history.

(56) References Cited

U.S. PATENT DOCUMENTS 4,677,420 A * 6/1987 Topic ................... F16D 65/0977
188/1.11 R
4,745,992 A * 5/1988 Lusa ................... F16D 65/0979
188/73.31
(Continued)

FOREIGN PATENT DOCUMENTS

EP  1982852 A1  10/2008
EP  3023666 A1   5/2016
EP  3032131 A1   6/2016

OTHER PUBLICATIONS

European Patent No. EP 0190705 to Topic et al dated Feb. 3, 1986.*
(Continued)

*Primary Examiner* — Pamela Rodriguez
(74) *Attorney, Agent, or Firm* — Brooks Kushman PC

(57) ABSTRACT

A disc brake assembly that includes a brake caliper, a retainer strap, and a sensor assembly. The retainer strap is mounted to the brake caliper and extends across a brake pad assembly. The sensor assembly is mounted to the retainer strap and generates a signal indicative of a position of the brake pad assembly.

22 Claims, 11 Drawing Sheets

(51) Int. Cl.
G01D 5/16 (2006.01)
G01D 5/165 (2006.01)

(56) References Cited

U.S. PATENT DOCUMENTS

| | | | |
|---|---|---|---|
| 6,272,914 B1* | 8/2001 | Ciotti | F16D 66/025 |
| | | | 188/11 |
| 8,857,575 B2 | 10/2014 | Philpott | |
| 9,618,067 B2* | 4/2017 | Philpott | F16D 66/028 |
| 10,309,470 B1 | 6/2019 | Philpott | |
| 10,323,705 B2* | 6/2019 | Knoop | F16D 55/2255 |
| 2006/0042890 A1* | 3/2006 | Samuelsson | F16D 55/00 |
| | | | 188/73.1 |
| 2008/0110707 A1 | 5/2008 | Kromer | |
| 2018/0106313 A1 | 4/2018 | Fricke et al. | |

OTHER PUBLICATIONS

German Patent No. DE 102021102324 to Aumuller dated Aug. 4, 2022.*
U.S. Appl. No. 16/930,169, filed Jul. 15, 2020; 29 Pages.
Extended European Search Report dated Oct. 12, 2022, for related European Appln. No. 22178234.5; 7 Pages.

* cited by examiner

DISC BRAKE ASSEMBLY HAVING A SENSOR ASSEMBLY

TECHNICAL FIELD

This relates to a disc brake assembly having a sensor assembly that may be mounted to a retainer strap.

BACKGROUND

A brake caliper assembly having a retainer strap is disclosed in U.S. Pat. No. 10,309,470.

SUMMARY

In at least one embodiment a disc brake assembly is provided. The disc brake assembly may include a brake caliper, a retainer strap, and a sensor assembly. The brake caliper defines a cavity that receives a brake pad assembly. The retainer strap is mounted to the brake caliper and extends across the cavity and the brake pad assembly. The sensor assembly is mounted to the retainer strap and generates a signal indicative of a position of the brake pad assembly.

In at least one embodiment a disc brake assembly is provided. The disc brake assembly may include a brake carrier, a brake caliper, a retainer strap, and a sensor assembly. The brake caliper is mounted to the brake carrier. The brake pad assembly is received in the brake carrier. The retainer strap is mounted to the brake caliper and extends across the brake pad assembly. The sensor assembly is mounted to the retainer strap. The sensor assembly includes a sensor that detects a position of the brake pad assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
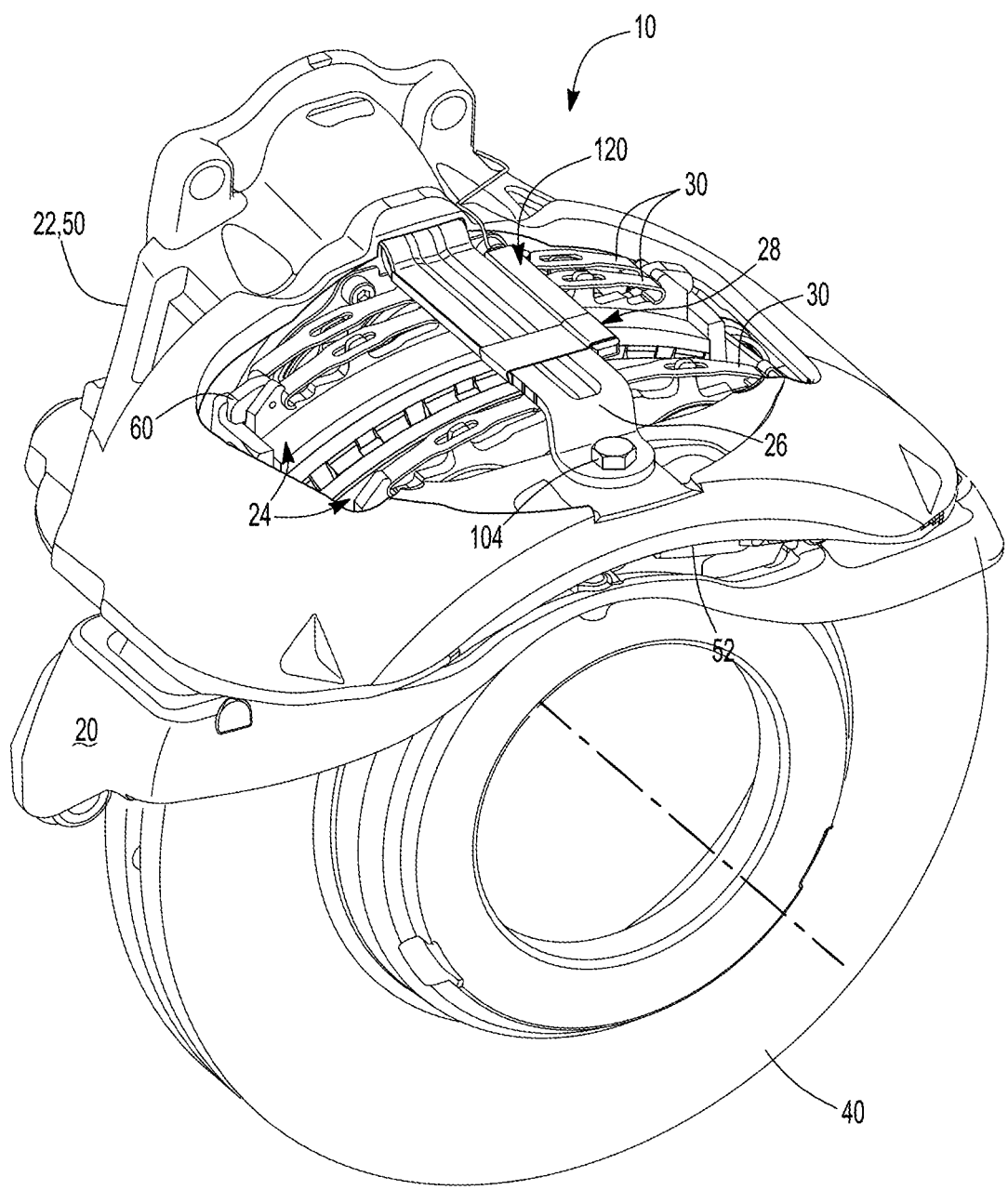
FIG. 1 is a perspective view of an example of a brake assembly having a sensor assembly.

Referring to FIG. 1, an example of a disc brake assembly 10 is shown. The disc brake assembly 10 may be provided as part of a vehicle, such as a truck, bus, farm equipment, military transport or weaponry vehicle, or cargo loading equipment for land, air, or marine vessels. In at least one configuration, the disc brake assembly 10 may include a brake carrier 20, a brake caliper 22, at least one brake pad assembly 24, a retainer strap 26, and a sensor assembly 28. One or more pad springs 30 may also be provided with the disc brake assembly 10.

The brake carrier 20 may facilitate mounting of the disc brake assembly 10. For instance, the brake carrier 20 may be fixedly mounted to a component of the vehicle, such as an axle assembly or a knuckle. The brake carrier 20 may receive and support the brake pad assemblies 24 and may include an opening through which a brake rotor 40 may extend. As such, the brake carrier 20 may straddle the brake rotor 40 and may help position brake pad assemblies 24 on opposite sides of the brake rotor 40.

The brake caliper 22 may be mounted to the brake carrier 20 and may support various components of the disc brake assembly 10. In addition, the brake caliper 22 may help position the brake pad assemblies 24 with respect to the brake rotor 40 to facilitate braking of the vehicle as will be discussed in more detail below. In at least one configuration, the brake caliper 22 may include a caliper housing 50 and a caliper bridge 52.

Figure 2:
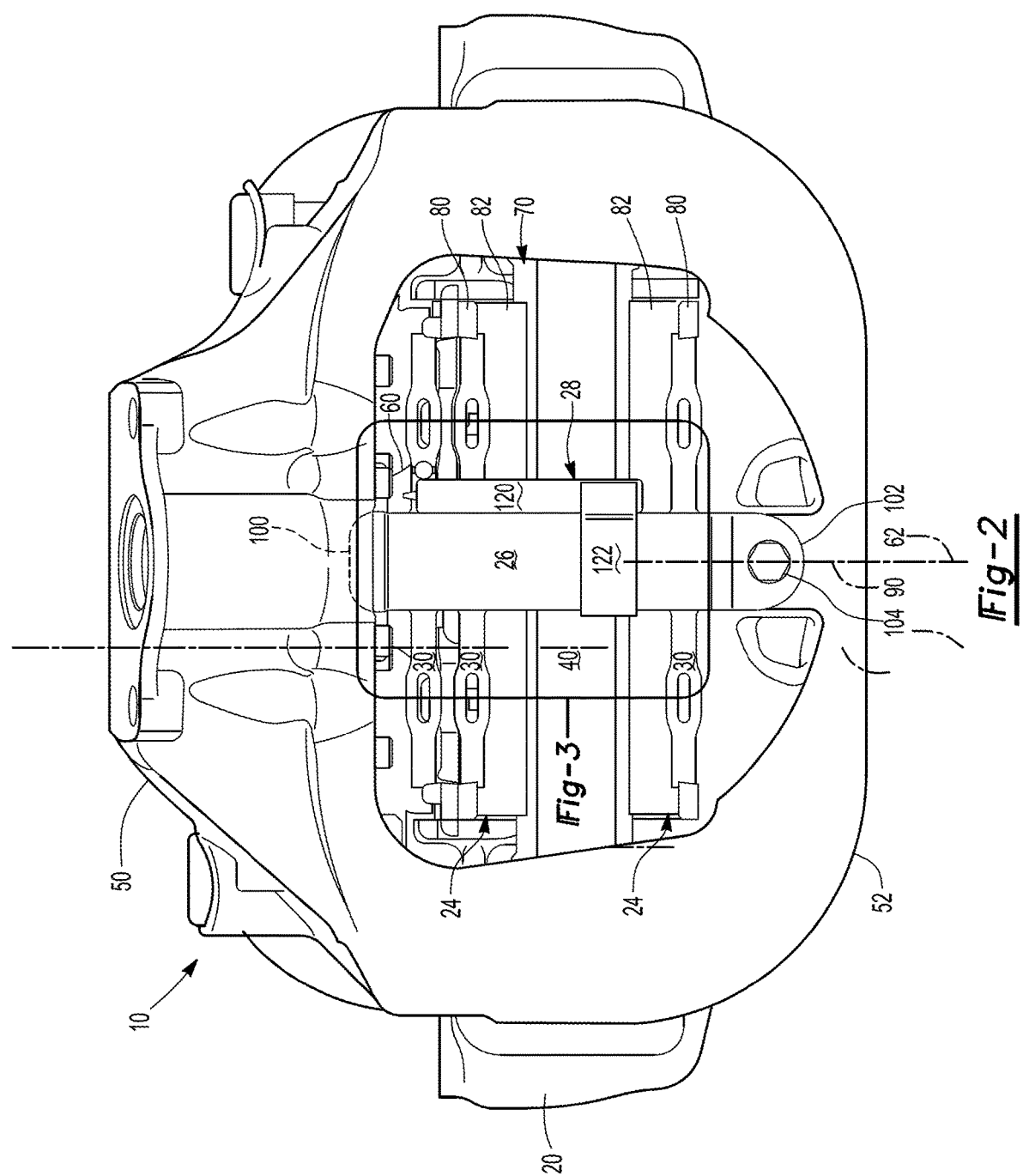
FIG. 2 is a top view of the brake assembly of FIG. 1.

Referring to FIGS. 1 and 2, the caliper housing 50 may be moveably disposed on the brake carrier 20. For example, the caliper housing 50 may be slidable along a pair of guide pins that may be fixedly disposed on the brake carrier 20. The caliper housing 50 may receive or support various components that may facilitate actuation of a brake pad assembly 24. For instance, the caliper housing 50 may support a tappet 60 that may protrude from an internal chamber of the caliper housing 50.

Referring primarily to FIG. 2, the tappet 60 may extend from the caliper housing 50 toward the brake rotor 40 to engage a brake pad assembly 24. The tappet 60 may be moveable along an axis 62 with respect to the caliper housing 50 such that the tappet 60 may move toward and away from the brake rotor 40. For instance, an actuator may extend the tappet 60 to actuate a brake pad assembly 24 that is disposed between the caliper housing 50 and the brake rotor 40 into engagement with the brake rotor 40. A reaction force may then move the caliper housing 50 and caliper bridge 52 with respect to the brake carrier 20 to actuate a brake pad assembly 24 that is disposed between the caliper bridge 52 and the brake rotor 40 into engagement with an opposite side of the brake rotor 40 to help slow rotation of the brake rotor 40 and an associated vehicle wheel. Optionally, one or more biasing members, such as retraction springs may be provided to facilitate retraction of the brake pad assemblies 24 away from the brake rotor 40 when braking is not desired.

The caliper bridge 52 may be fixedly positioned with respect to the caliper housing 50. The caliper bridge 52 may be integrally formed with the caliper housing 50 or may be a separate component that is mounted to the caliper housing 50. For example, the caliper bridge 52 may be coupled or secured to the caliper housing 50 with one or more fasteners, such as bolts. In at least one configuration, the caliper bridge 52 may cooperate with the caliper housing 50 to define a cavity 70, which is best shown in FIG. 2.

The cavity 70 may at least partially receive the brake pad assemblies 24 and the brake rotor 40. The cavity 70 may be configured as a large through hole that may be encircled by the brake caliper 22. A portion of the brake carrier 20 may extend into the cavity 70 and may help position the brake pad assemblies 24. A brake pad assembly 24 may be inserted into the cavity 70 and installed on the brake carrier 20 or removed from the cavity 70 and the brake carrier 20 when the retainer strap 26 is removed.

Referring primarily to FIG. 2, a pair of brake pad assemblies 24 may be received in the brake carrier 20. The brake pad assemblies 24 may be disposed on opposite sides of the brake rotor 40 and may have similar or identical configurations. In at least one configuration, a brake pad assembly 24 may include a backplate 80 and friction material 82.

The backplate 80 may be a structural member of the brake pad assembly 24. The backplate 80 may be configured as a generally flat plate and may be made of any suitable material, such as a metal alloy. The tappet 60 may engage the backplate 80 of the brake pad assembly 24 that is positioned between the brake rotor 40 and the caliper housing 50. For instance, the tappet 60 may engage a side of the backplate 80 that may face away from the brake rotor 40 and that may be disposed opposite the friction material 82. The backplate 80 of the other brake pad assembly 24 may engage the caliper bridge 52.

The friction material 82 may be disposed on a side of the backplate 80 that may face toward the brake rotor 40. The friction material 82 may contact the brake rotor 40 during vehicle braking.

The retainer strap 26 may be removably mountable to the brake caliper 22. For instance, the retainer strap 26 may be removed from the brake caliper 22 to facilitate removal or replacement of a brake pad assembly 24 and may be installed on the brake caliper 22 to inhibit removal of a brake pad assembly 24. For example, the retainer strap 26 may extend across the brake pad assemblies 24 and the cavity 70 of the brake caliper 22 to help retain the brake pad assemblies 24 in the brake carrier 20 when the retainer strap 26 is secured to the brake caliper 22. The retainer strap 26 may engage or contact a brake pad assembly 24 or a pad spring 30 when the retainer strap 26 is installed and secured to the brake caliper 22.

The pad spring 30, if provided, may be at least partially disposed in the cavity 70. The pad spring 30 may exert a biasing force against a component that is received in the cavity 70 such as a brake pad assembly 24 or the tappet 60. In the configuration shown, three pad springs 30 are illustrated; however, it is contemplated that a lesser number of pad springs 30 may be provided. The pad springs 30 may be spaced apart from each other and may extend from the retainer strap 26 into the cavity 70. For instance, from the perspective shown in FIG. 2 the uppermost pad spring 30 may extend from the retainer strap 26 to the tappet 60, the middle pad spring 30 may extend from the retainer strap 26 to the first brake pad assembly 24, and the remaining pad spring 30 may extend from the retainer strap 26 to the second brake pad assembly 24.

In at least one configuration and as is best shown with reference to FIG. 2, the retainer strap 26 may extend along an axis 90. The axis 90 may be oriented to extend between a first end 100 of the retainer strap 26 and a second end 102 of the retainer strap 26. As such, the retainer strap 26 and the axis 90 may extend substantially parallel to an axis of rotation of the brake rotor 40 and may extend substantially parallel to the axis 62 along which the brake pad assemblies 24 are actuatable. The term "substantially parallel" as used herein means the same as or very close to parallel and includes features or axes that are within ±2° of being parallel each other.

The first end 100 of the retainer strap 26 may be mounted to the caliper housing 50. For instance, the first end 100 may contact the caliper housing 50 and optionally may be received in an opening, notch, or slot in the caliper housing 50.

The second end 102 of the retainer strap 26 may be disposed opposite the first end 100. The second end 102 may be disposed on the caliper bridge 52 and may be secured to the caliper bridge 52, such as with a fastener 104 like a bolt. The fastener 104 may extend through a hole in the retainer strap 26. In at least one configuration, the second end 102 may be offset from the first end 100 in a generally vertical direction such that the second end 102 is disposed closer to the axis of rotation of the brake rotor 40 than the first end 100 is disposed to the axis of rotation.

Figure 3:
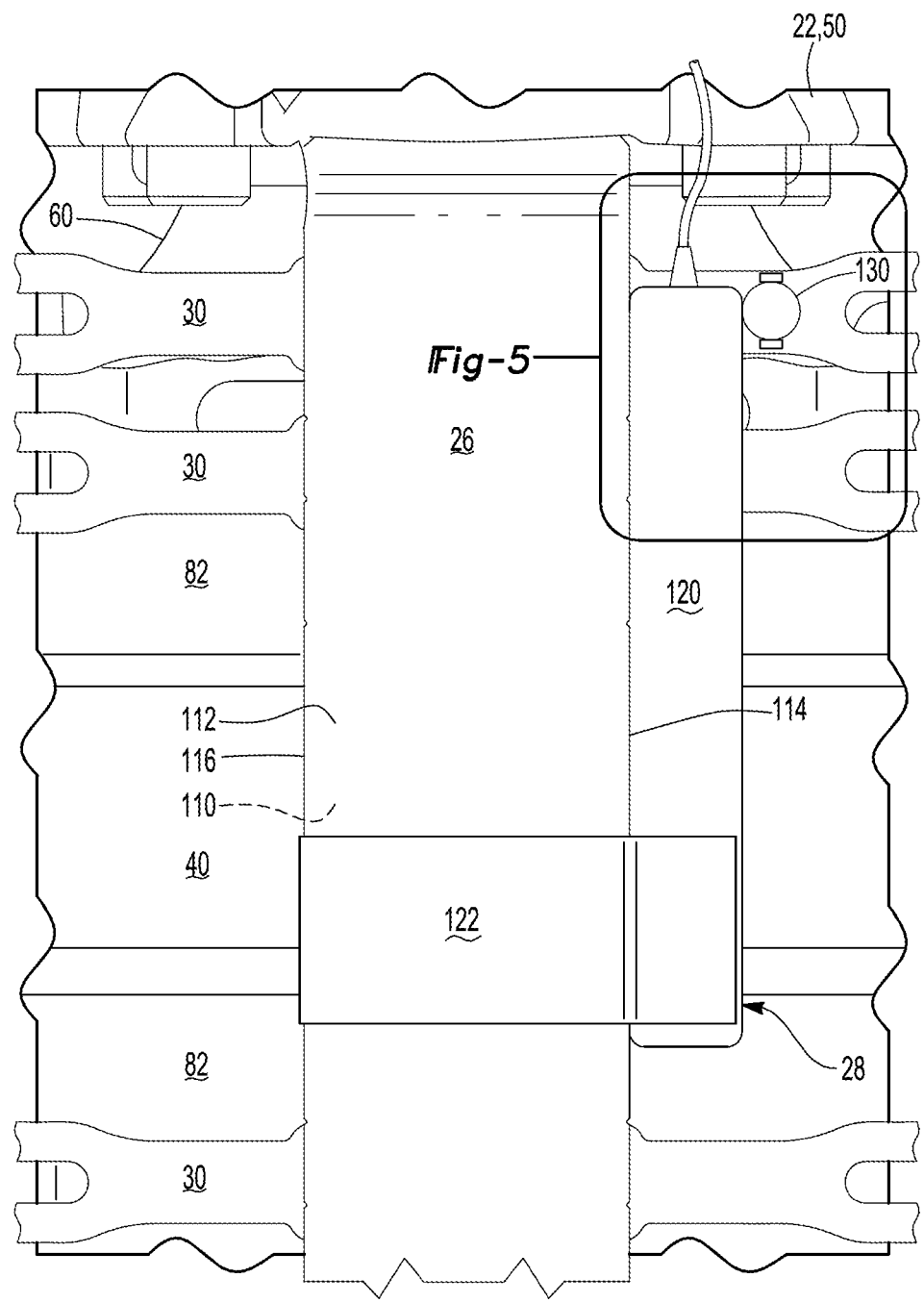
FIG. 3 is a magnified view of a portion of FIG. 2 showing the brake assembly in a first position.

Referring primarily to FIG. 3, the retainer strap 26 may also include an inner side 110, an outer side 112, a first lateral side 114, and a second lateral side 116.

The inner side 110 may face toward the brake carrier 20, the brake pad assemblies 24, and the brake rotor 40. The pad springs 30 may engage or contact the inner side 110.

The outer side 112 may be disposed opposite the inner side 110. As such, the outer side 112 may face away from the brake carrier 20 and the brake pad assemblies 24.

The first lateral side 114 may extend between the inner side 110 and the outer side 112. For instance, the first lateral side 114 may extend from the inner side 110 to the outer side 112. The first lateral side 114 may be disposed substantially perpendicular to the inner side 110, the outer side 112, or portions thereof. The term "substantially perpendicular" is used herein to designate features or axes that are the same as or very close to perpendicular and includes features that are within ±2° of being perpendicular each other. In addition, the first lateral side 114 may extend between the first end 100 and the second end 102. For example, the first lateral side 114 may extend from the first end 100 toward the second end 102, from the second end 102 toward the first end 100, or from the first end 100 to the second end 102.

The second lateral side 116 may be disposed opposite the first lateral side 114. In addition, the second lateral side 116 may extend between the inner side 110 and the outer side 112. For instance, the second lateral side 116 may extend from the inner side 110 to the outer side 112. In addition, the second lateral side 116 may extend between the first end 100 and the second end 102. For example, the second lateral side 116 may extend from the first end 100 toward the second end 102, from the second end 102 toward the first end 100, or from the first end 100 to the second end 102. In at least one configuration, the first lateral side 114 or a portion thereof may be disposed in a substantially parallel relationship with the second lateral side 116. The designations for the first lateral side 114 and the second lateral side 116 may be reversed from what is shown.

Referring primarily to FIGS. 2 and 3, the sensor assembly 28 may generate a signal indicative of a position of a brake pad assembly 24. The signal or change thereof may be used to determine brake stroke or travel of a brake pad assembly 24. The sensor assembly 28 may be mounted to the retainer strap 26. In addition, the sensor assembly 28 may be spaced apart from and may not contact other components of the disc brake assembly 10, such as the brake carrier 20, brake caliper 22, brake pad assemblies 24, pad springs 30, or combinations thereof.

The sensor assembly 28 may have a shorter length than the retainer strap 26. As such, the sensor assembly 28 may extend across a portion of the cavity 70. For instance, the sensor assembly 28 may extend at least partially across the one or more brake pad assemblies 24, the brake rotor 40, the tappet 60, or combinations thereof. In the configuration shown, the sensor assembly 28 extends across the first brake pad assembly 24 and the brake rotor 40 and extends partially across the second brake pad assembly 24 and the tappet 60. In at least one configuration, the sensor assembly 28 may include a sensor 120 and may optionally include a mounting bracket 122.

The sensor 120 may be disposed adjacent to the retainer strap 26. For instance, the sensor 120 may be disposed adjacent to and may contact the first lateral side 114 or the second lateral side 116 of the retainer strap 26.

The sensor 120 may be of any suitable type. For instance, the sensor 120 may be a variable resistance sensor, such as a linear potentiometer, or a membrane sensor. The sensor 120 may be encapsulated such that the sensor 120 may be water resistant or waterproof and may be dust resistant or dustproof, thereby allowing the sensor 120 to be mounted externally to the disc brake assembly 10 while withstanding expected environmental conditions.

The sensor 120 may be configured to directly or indirectly detect a position of a brake pad assembly 24. For instance, the sensor 120 may detect a locator feature 130 that may be moveable with the brake pad assembly 24 and that may move with respect to the sensor 120. The sensor 120 may generate a signal that may be based on the position of the locator feature 130. The locator feature 130 may be provided with a brake pad assembly 24, a pad spring 30, tappet 60, or combinations thereof. For illustration purposes, the locator feature 130 is disposed on a pad spring 30 that extends from the tappet 60 in FIGS. 4-6, and 9-11, In the configuration shown in FIGS. 7 and 8, the locator feature 130 is disposed on a pad spring 30 that extends from the first brake pad assembly 24.

The locator feature 130 may have any suitable configuration. For instance, the locator feature 130 may be integrally formed with a brake pad assembly 24, pad spring 30, or tappet 60 or may be provided as a separate component. In the configuration shown, the locator feature 130 is configured as a protrusion that is disposed on a pad spring 30 and that extends away from the brake carrier 20 and the cavity 70. As such, the locator feature 130 may be disposed on a side of a pad spring 30 that faces away from the brake pad assembly 24 and the axis of rotation of the brake rotor 40.

The sensor 120 may be a non-contact sensor or a contact sensor. In a non-contact configuration, the sensor 120 may be spaced apart from and may not contact the locator feature 130, such as is shown in FIGS. 5, 7, 10 and 11. In a non-contact configuration, the locator feature 130 may be detected in any suitable manner, including but not limited to acoustically, capacitively, inductively, optically, magnetically, or combinations thereof. For instance, the locator feature 130 may be configured as a magnet that may actuate the sensor 120 or may be detected by the sensor 120. For instance, the magnetic field created by the magnet may attract a moveable feature of the sensor 120, such as an arm that may be operatively connected to a sliding contact of the sensor 120. Movement of the sliding contact may alter the effective length of a conductor of the sensor 120 as the locator feature 130 moves with respect to the sensor 120. As another example, a membrane potentiometer may have a conductive membrane that may be deformed by the magnetic field of the magnet or actuated in response to the magnetic field generated by the magnet and thus may be used to sense the position of the locator feature 130.

Figure 6:
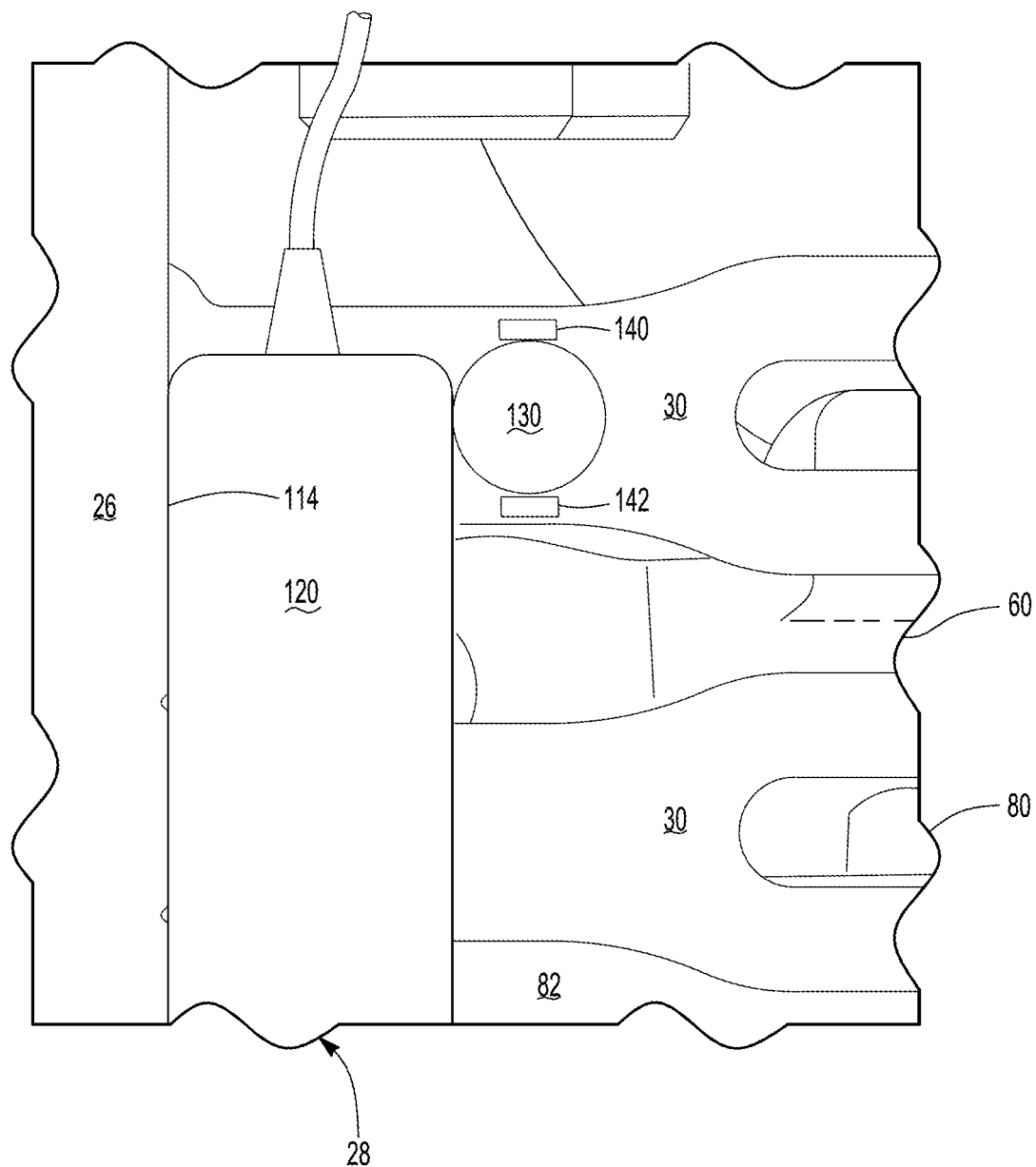
FIG. 6 is a magnified view showing the locator feature that contacts the sensor assembly.
Figure 7:
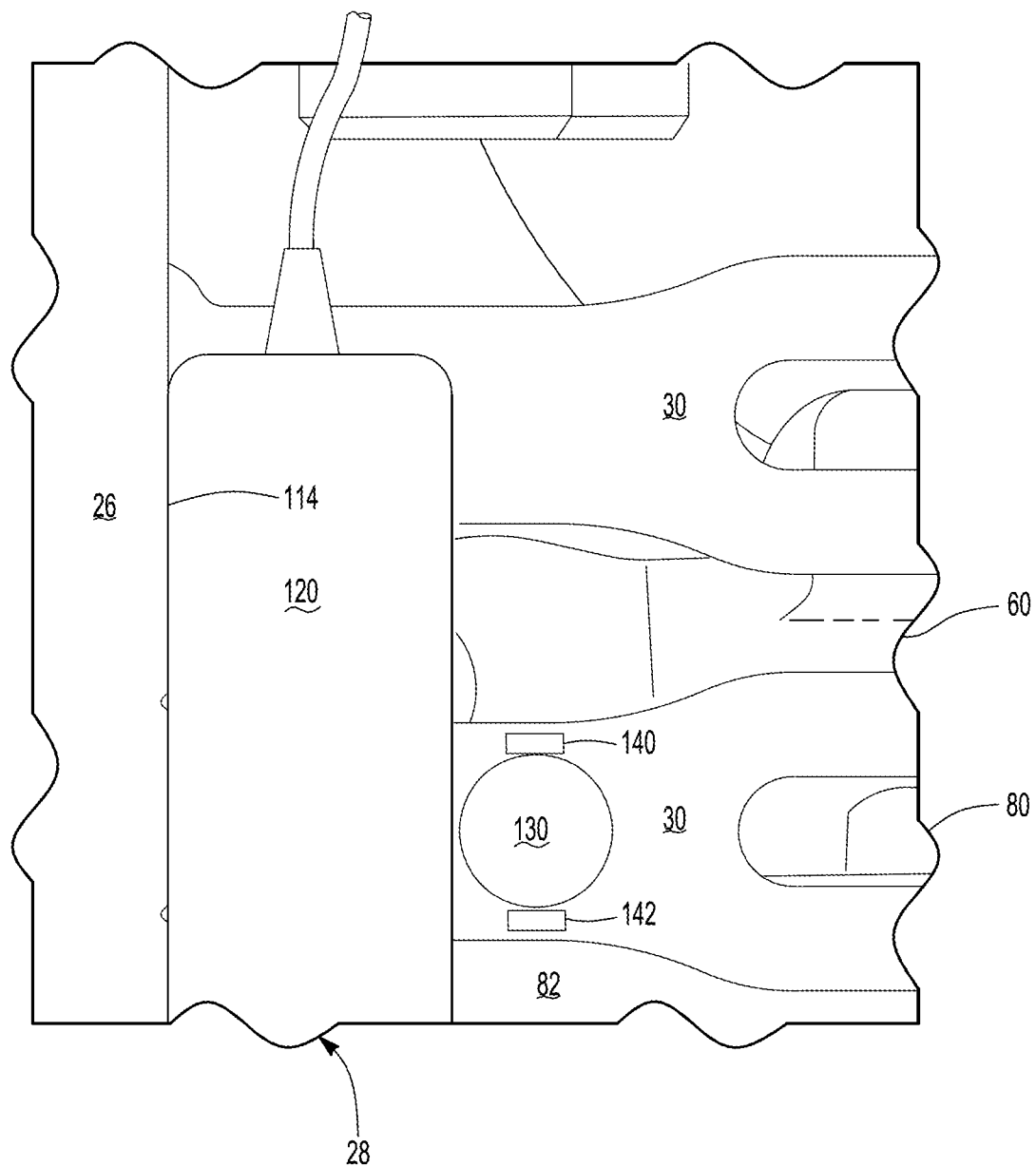
FIG. 7 is a magnified view showing the locator feature that is spaced apart from the sensor assembly and that disposed on another pad spring.
Figure 8:
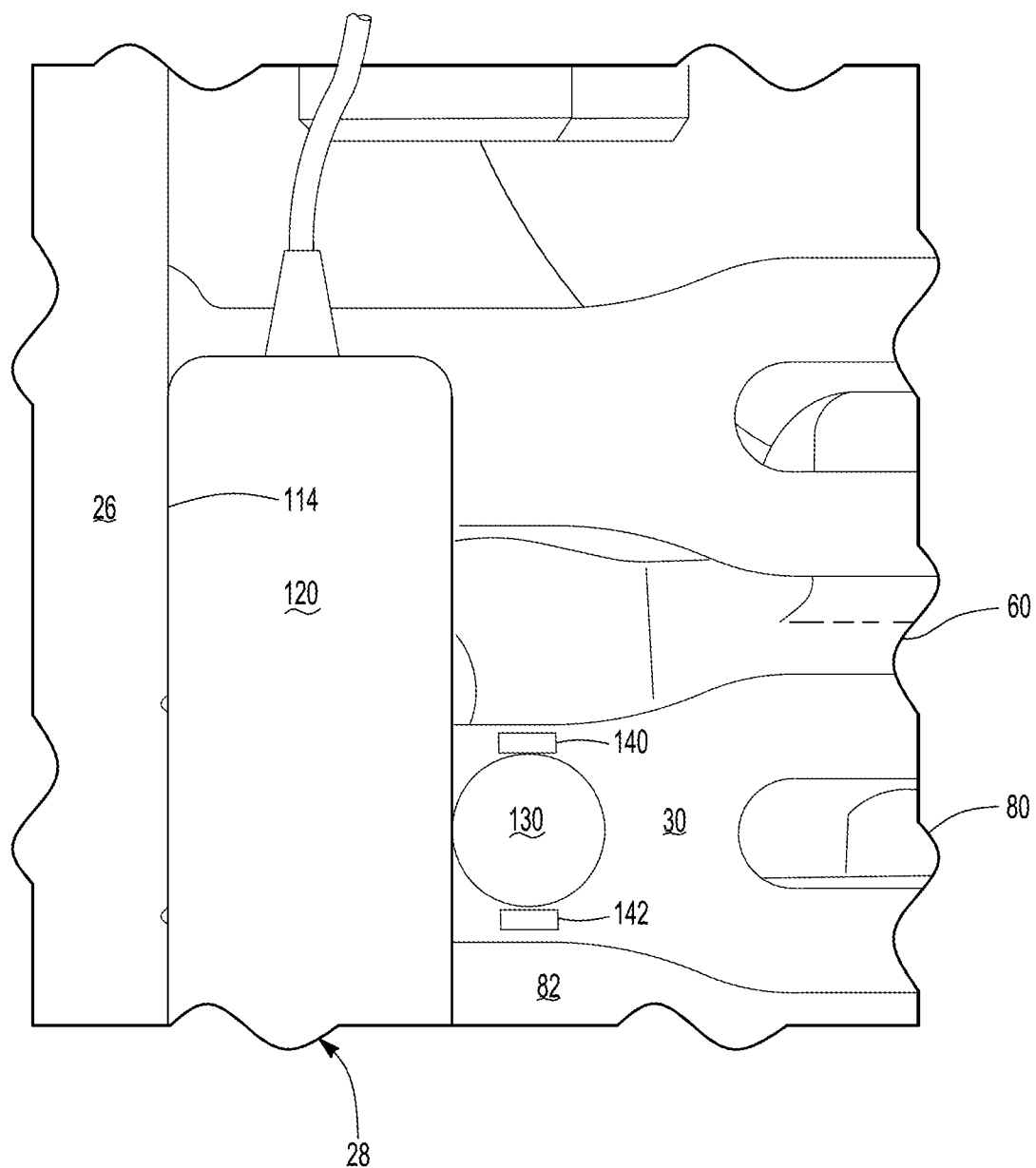
FIG. 8 is a magnified view showing the locator feature that contacts the sensor assembly and that is disposed on the same pad spring as in FIG. 7.

In a contact configuration, the locator feature 130 may contact the sensor 120 and may exert force that may be detected by the sensor 120. Examples of a contact configuration are shown in FIGS. 6 and 8. For instance, the locator feature 130 may contact the sensor 120 or a moveable component of the sensor 120, such as a sliding element like an arm or may deform a deformable element of the sensor 120, such as a conductive membrane. The locator feature 130 may or may not be a magnet when a contact configuration is provided.

Figure 5:
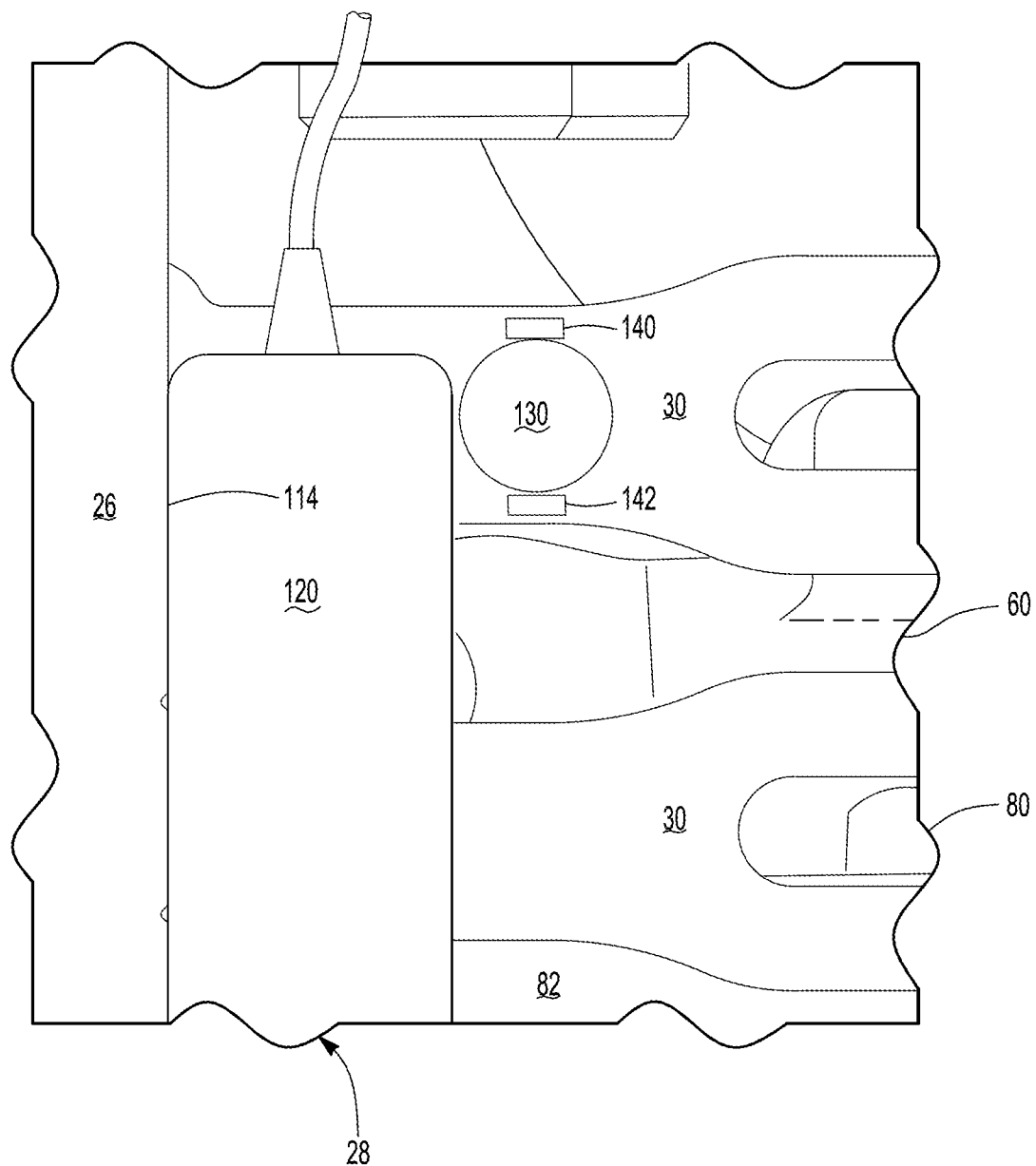
FIG. 5 is a magnified view of a portion of FIG. 3 showing a locator feature that is spaced apart from the sensor assembly.

Referring to primarily to FIG. 5, one or more positioning features may be provided to inhibit movement of the locator feature 130. A positioning feature may extend from a component to which the location feature in mounted. For example, a first positioning feature 140 and a second positioning feature 142 may extend from. a pad spring 30 and may engage the locator feature 130 to inhibit movement of the locator feature 130 with respect to the pad spring 30. The first positioning feature 140 and the second positioning feature 142 may be arranged along the direction of travel of the brake pad assembly. For instance, the first positioning feature 140 and the second positioning feature 142 may be positioned on opposite sides of the locator feature 130 such that the first positioning feature 140 may be positioned between the caliper housing 50 and the locator feature 130 while the second positioning feature 142 may be positioned between the caliper bridge 52 and the locator feature 130. In at least one configuration, a positioning feature may not be positioned between the sensor 120 and the locator feature 130.

Referring to FIG. 3, the mounting bracket 122, if provided, may couple the sensor 120 to the retainer strap 26. In at least one configuration, the mounting bracket 122 may be disposed on the outer side 112 of the retainer strap 26. For instance, the mounting bracket 122 may extend across the outer side 112 and may have a retention feature such as a hook disposed at a distal end. The retention feature may extend along the second lateral side 116 toward or to the inner side 110 of the retainer strap 26. It is also contemplated that this orientation may be reversed. The mounting bracket 122 may be spaced apart from and may not contact other components of the disc brake assembly 10, such as the brake carrier 20 and the brake caliper 22.

Figure 9:
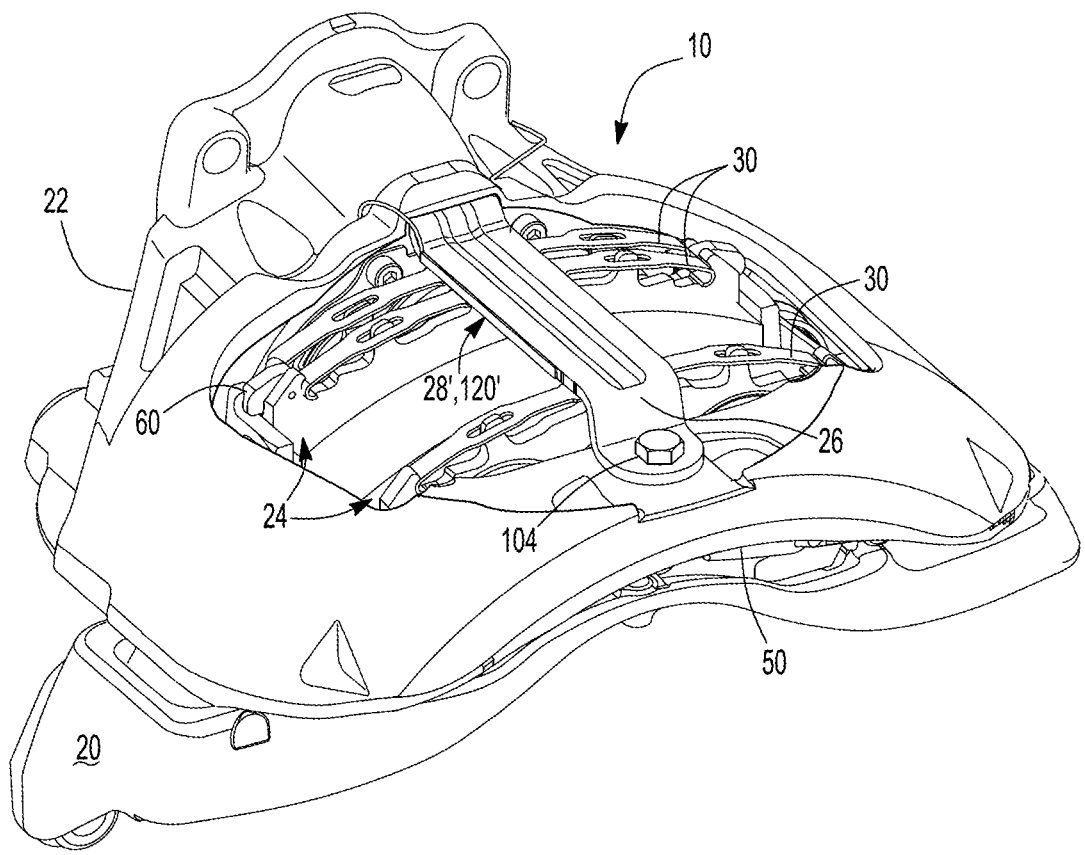
FIG. 9 is a perspective view of the brake assembly and a second configuration of a sensor assembly.
Figure 10:
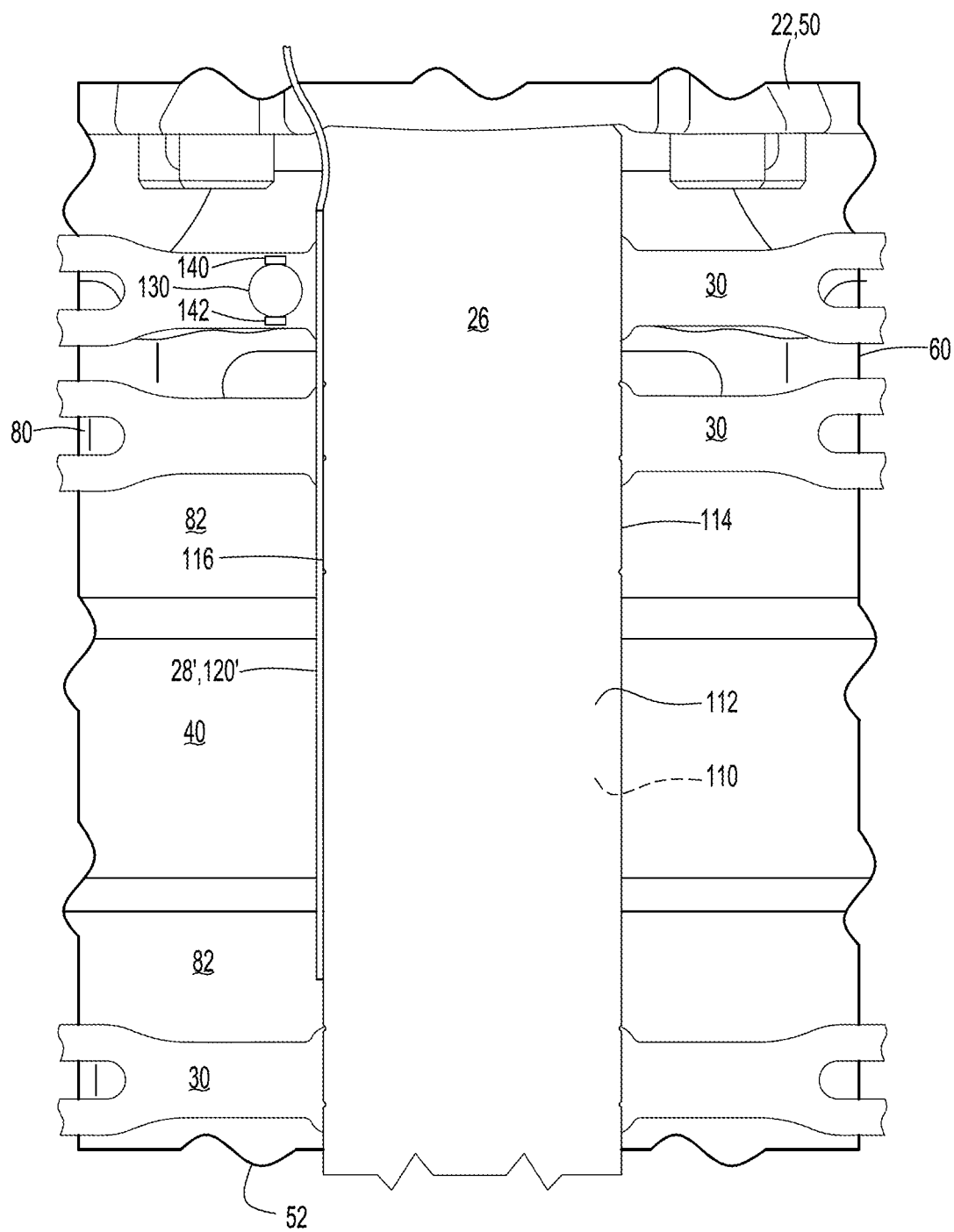
FIG. 10 is a magnified view of the brake assembly of FIG. 9 showing the brake assembly in a first position.
Figure 11:
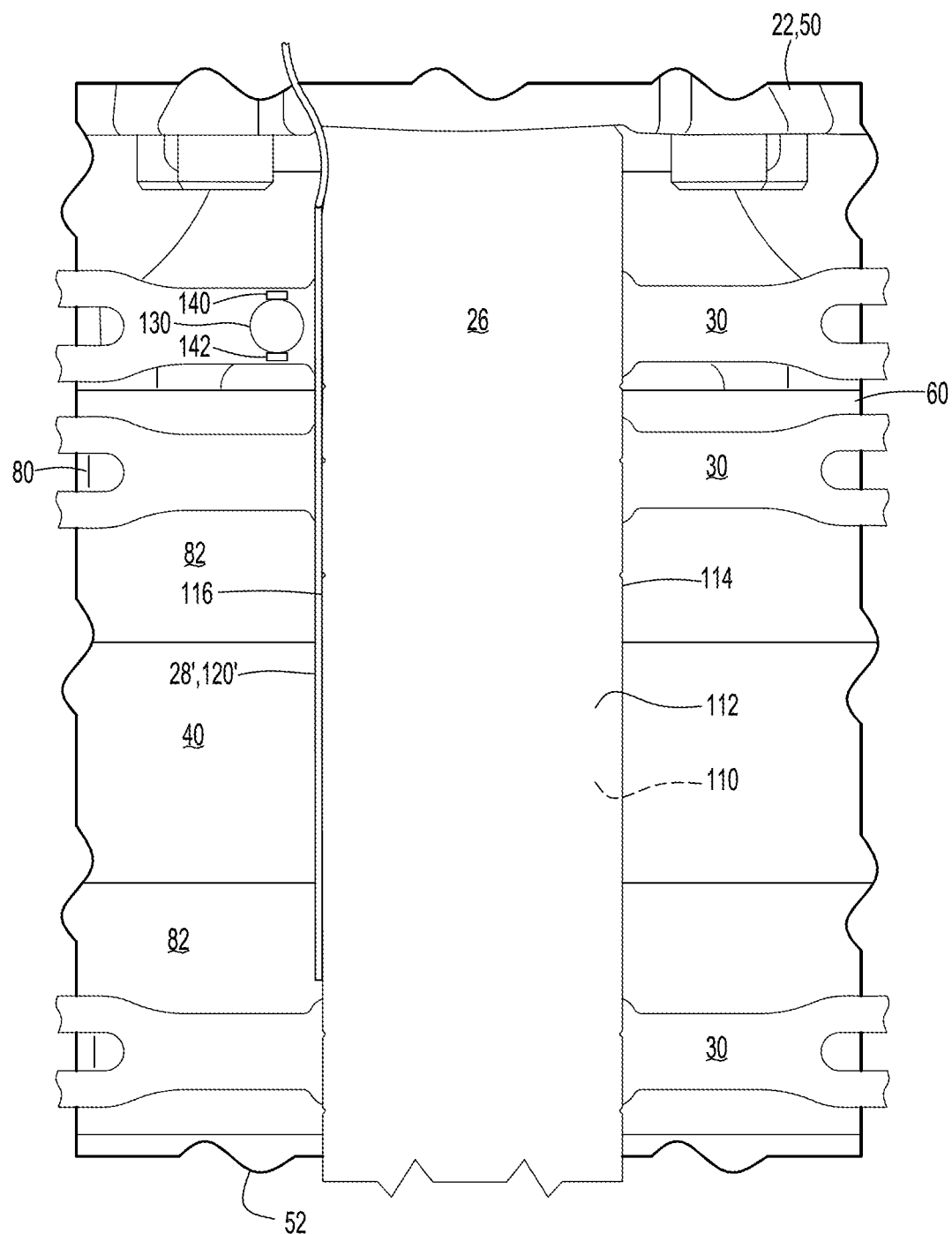
FIG. 11 is a magnified view showing the brake assembly in a second position.

Referring to FIGS. 9-11, a sensor assembly 28' is shown without a mounting bracket. For instance, the sensor assembly 28' may be attached to the retainer strap 26 in any suitable manner, such as with an adhesive, fastener, or the like. The sensor assembly 28' may be disposed on a lateral side of the retainer strap 26, such as the first lateral side 114 or the second lateral side 116 and is depicted with a sensor 120' having a thinner profile than the configuration shown in FIGS. 1-8. The sensor 120' may be configured as a membrane sensor in such a configuration. It is also contemplated that the sensor assembly 28' may be provided on the inner side 110 of the retainer strap 26.

Figure 4:
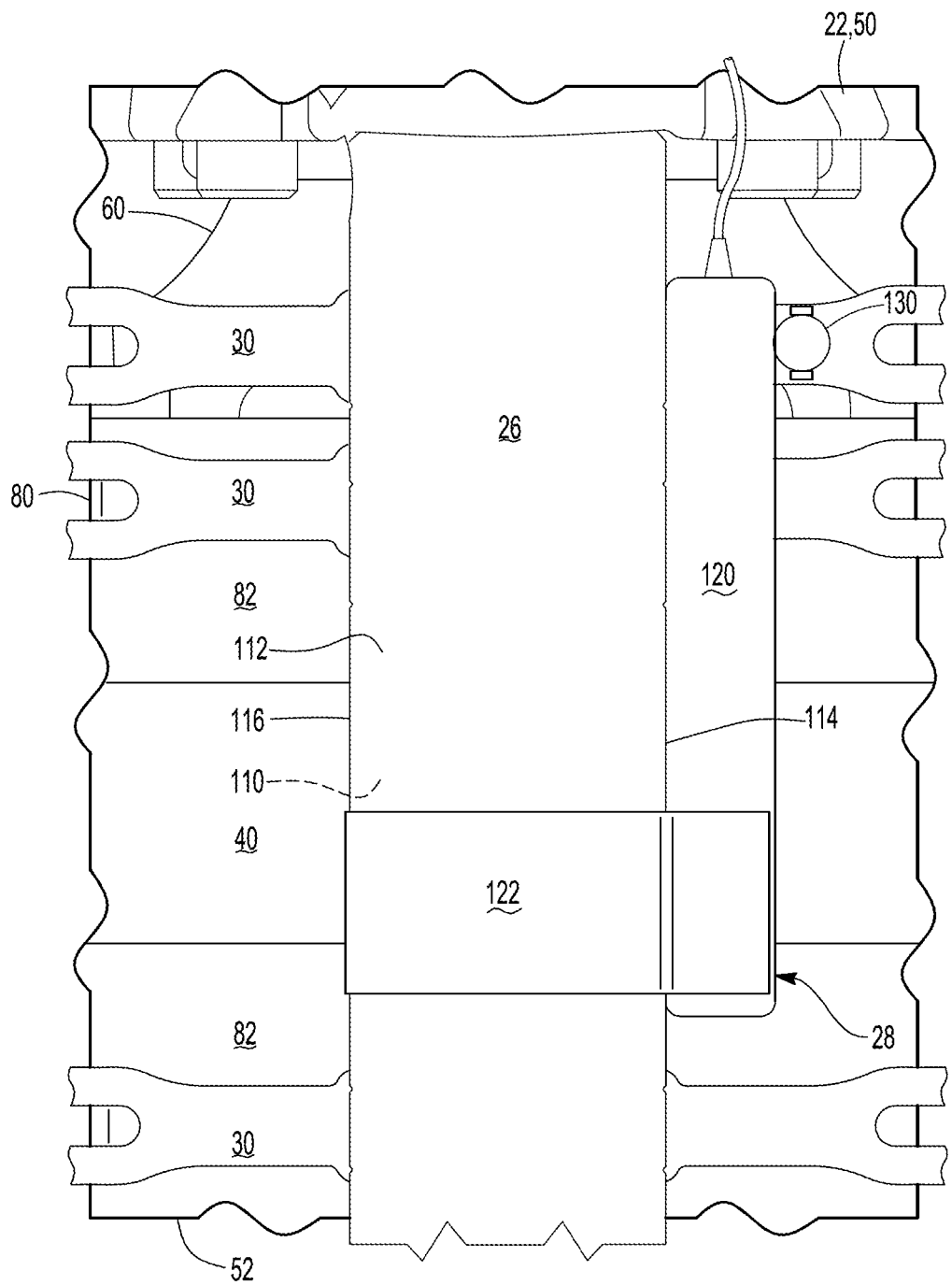
FIG. 4 is a magnified view showing the brake assembly in a second position.

Movement that is detected by the sensor 120, 120' is best understood by comparing FIGS. 3 and 4 and FIGS. 10 and 11. In FIGS. 3 and 10, the brake assembly 10 is shown in a first position in which the brake pad assemblies 24 are retracted and spaced apart from the brake rotor 40. In FIGS. 4 and 11, the brake assembly 10 is shown in a second position in which the brake pad assemblies 24 are extended to engage the brake rotor 40 and exert friction against the brake rotor 40. The signal generated by the sensor 120, 120' may change as the position of the brake pad assembly 24 and hence the position of the locator feature 130 changes.

The sensor assemblies 28, 28' as described above may communicate with a control system, such as a brake control system that may include a microprocessor-based controller. Communication may occur wirelessly or via a wire or cable.

A brake assembly as described above may allow a sensor assembly to be provided that may generate a signal indicative of a position of a brake pad assembly. The signal may be used to determine whether the brake assembly is functioning as intended. For instance, the signal may be used to monitor or detect movement of a brake pad assembly when braking is requested (i.e., brake stroke) or when the position of the tappet or one or more brake pad assemblies is adjusted to compensate for wear of friction material (e.g., operation of a wear adjuster mechanism that adjusts the running clearance between the friction material and the brake rotor). If movement is not detected when braking is requested, then the signal from the sensor may be indicative of potential dragging of a brake pad assembly or an issue with the operation of the brake pad actuation system or wear adjuster mechanism. In response, a notification may be provided to a vehicle operator or maintenance system.

The sensor assembly as described above may be positioned outside of the brake caliper, which may eliminate the need to provide space inside of the brake caliper to accommodate the sensor assembly. In addition, providing the sensor assembly outside of the brake caliper may eliminate potential leak paths between the inside of the brake caliper and the surrounding environment. For instance, a wire or cable does not need to be routed through a hole in the brake caliper assembly to reach the sensor assembly when an externally mounted sensor assembly is provided.

The sensor assembly may be mounted to the pad strap where it may be easily accessed for installation or removal and may be visually inspected without disassembling the brake assembly. Moreover, the sensor assembly may be installed during fabrication of the brake assembly or may be added as an aftermarket product to provide additional functionality. In addition, the sensor assembly may be compatible with a variety of brake assembly models that may be made by different manufacturers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake assembly comprising:
a brake caliper that defines a cavity that receives a brake pad assembly;
a retainer strap that is mounted to the brake caliper and that extends across the cavity and the brake pad assembly; and
a sensor assembly that is mounted to the retainer strap and that generates a signal indicative of a position of the brake pad assembly.

2. The disc brake assembly of claim 1 wherein the sensor assembly includes a sensor and a mounting bracket that couples the sensor to the retainer strap.

3. The disc brake assembly of claim 2 wherein the retainer strap includes an inner side that faces toward the brake pad assembly and an outer side that is disposed opposite the inner side, wherein the mounting bracket is disposed on the outer side.

4. The disc brake assembly of claim 2 wherein the retainer strap includes an inner side that faces toward the brake pad assembly, an outer side that is disposed opposite the inner side, and a lateral side that extends between the inner side and the outer side, wherein the sensor is disposed adjacent to the lateral side.

5. The disc brake assembly of claim 2 wherein the retainer strap extends across a second brake pad assembly that is received in the cavity and the sensor assembly extends at least partially across the brake pad assembly and the second brake pad assembly.

6. The disc brake assembly of claim 5 wherein the mounting bracket engages a second lateral side of the retainer strap that is disposed opposite the sensor.

7. The disc brake assembly of claim 1 wherein the sensor assembly includes a sensor that is located on the retainer strap and is not located on the brake pad assembly.

8. A disc brake assembly comprising:
a brake carrier;
a brake caliper that is mounted to the brake carrier;
a brake pad assembly that is received in the brake carrier;
a retainer strap that is mounted to the brake caliper and that extends across the brake pad assembly; and
a sensor assembly that is mounted to the retainer strap and that includes a sensor that detects a position of the brake pad assembly.

9. The disc brake assembly of claim 8 wherein the sensor is a variable resistance sensor.

10. The disc brake assembly of claim 8 wherein the sensor is a linear potentiometer.

11. The disc brake assembly of claim 8 wherein the sensor is a membrane sensor that is actuated in response to a magnetic field generated by a magnet.

12. The disc brake assembly of claim 8 wherein the sensor detects a locator feature that is moveable with the brake pad assembly.

13. The disc brake assembly of claim 12 wherein the locator feature contacts the sensor.

14. The disc brake assembly of claim 12 wherein the locator feature is spaced apart from the sensor and does not contact the sensor.

15. The disc brake assembly of claim 12 wherein the locator feature is a magnet.

16. The disc brake assembly of claim 12 wherein the locator feature is disposed on a pad spring that extends from the retainer strap.

17. The disc brake assembly of claim 16 wherein the locator feature is disposed on a side of the pad spring that faces away from the brake pad assembly.

18. The disc brake assembly of claim 16 wherein the pad spring is mounted to the brake pad assembly.

19. The disc brake assembly of claim 16 wherein the pad spring is mounted to a tappet that is moveable with respect to the brake caliper and that extends from the brake caliper to the brake pad assembly.

20. The disc brake assembly of claim 16 further comprising first and second positioning features that extend from the pad spring and that engage the locator feature to inhibit movement of the locator feature.

21. The disc brake assembly of claim 20 wherein the first and second positioning features are positioned on opposite sides of the locator feature and are arranged along a direction of travel of the brake pad assembly such that the first and second positioning features are not located between the locator feature and the sensor.

22. The disc brake assembly of claim 8 wherein the sensor is located on the retainer strap and is not located on the brake pad assembly.

\* \* \* \* \*